Feb. 6, 1923. 1,444,528.

J. J. SCHREIBER.

PROCESS AND APPARATUS FOR TREATING CEREALS.

FILED JAN. 22, 1921.

2 SHEETS—SHEET 1.

Inventor
John J. Schreiber

By Paul & Paul
His Attorneys

Feb. 6, 1923.

J. J. SCHREIBER.

1,444,528.

PROCESS AND APPARATUS FOR TREATING CEREALS.

FILED JAN. 22, 1921.

2 SHEETS—SHEET 2.

Inventor
John J. Schreiber
By Paul & Paul
His Attorneys

Patented Feb. 6, 1923. 1,444,528

UNITED STATES PATENT OFFICE.

JOHN J. SCHREIBER, OF MINNEAPOLIS, MINNESOTA.

PROCESS AND APPARATUS FOR TREATING CEREALS.

Application filed January 22, 1921. Serial No. 439,249.

*To all whom it may concern:*

Be it known that I, JOHN J. SCHREIBER, a citizen of the United States, resident of Minneapolis, county of Hennepin, State of Minnesota, have invented certain new and useful Improvements in Processes and Apparatus for Treating Cereals, of which the following is a specification.

The object of my invention is to provide means for delivering a brine spray into a moving stream of cereal, such as ground feed, for the purpose of impregnating the material with the brine without, however, adding to the percentage of moisture contained therein.

A further object is to provide improved means for controlling the delivery of the brine to the pipe or conduit through which the feed is passing and an improved means for testing the brine before delivery to the feed.

Other objects of the invention will appear from the following detailed description.

The invention consists generally in various constructions and combinations, all as hereinafter described and particularly pointed out in the claims.

Figures 1, 6:
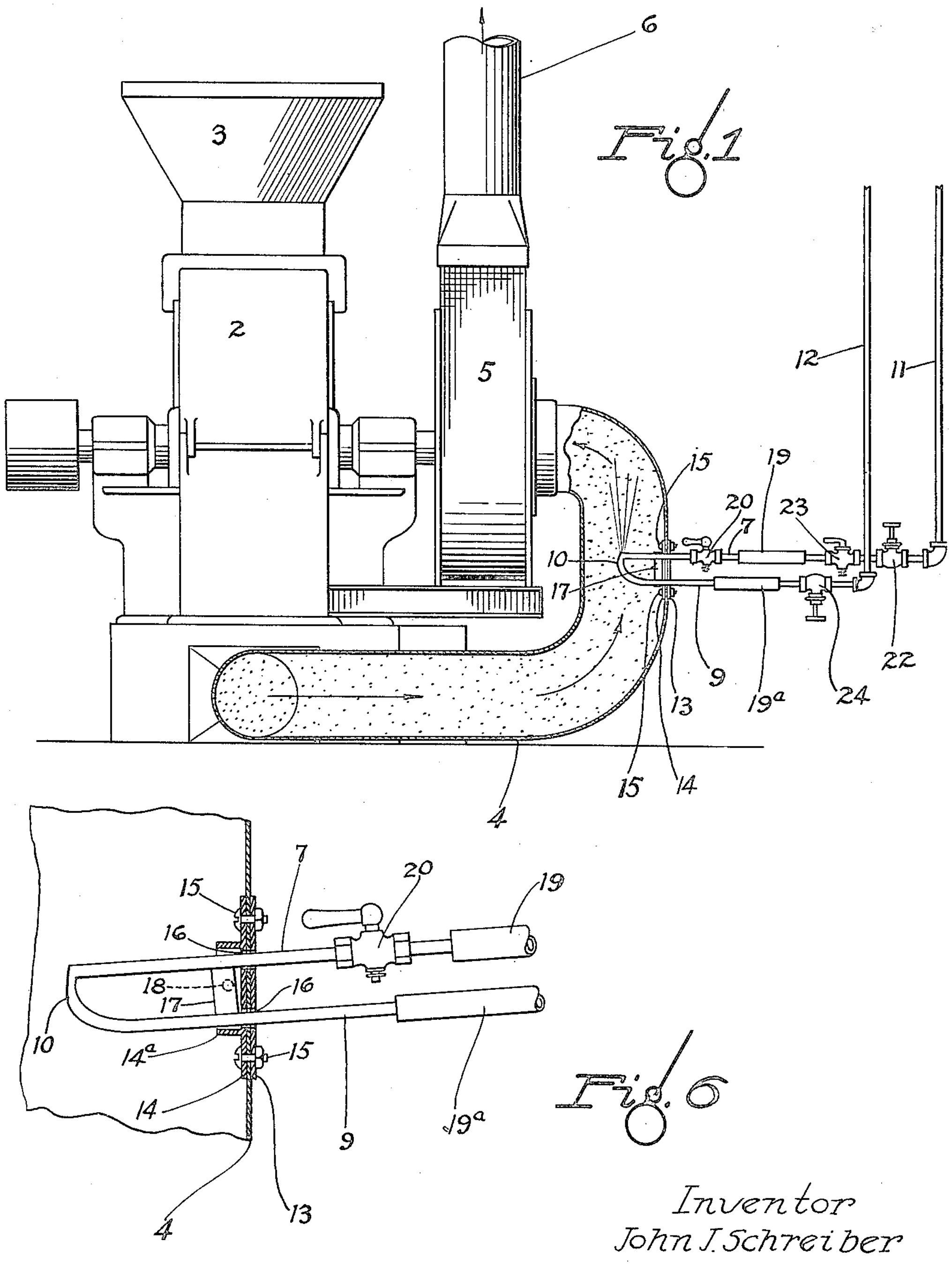
Figures 2, 3, 4, 5:
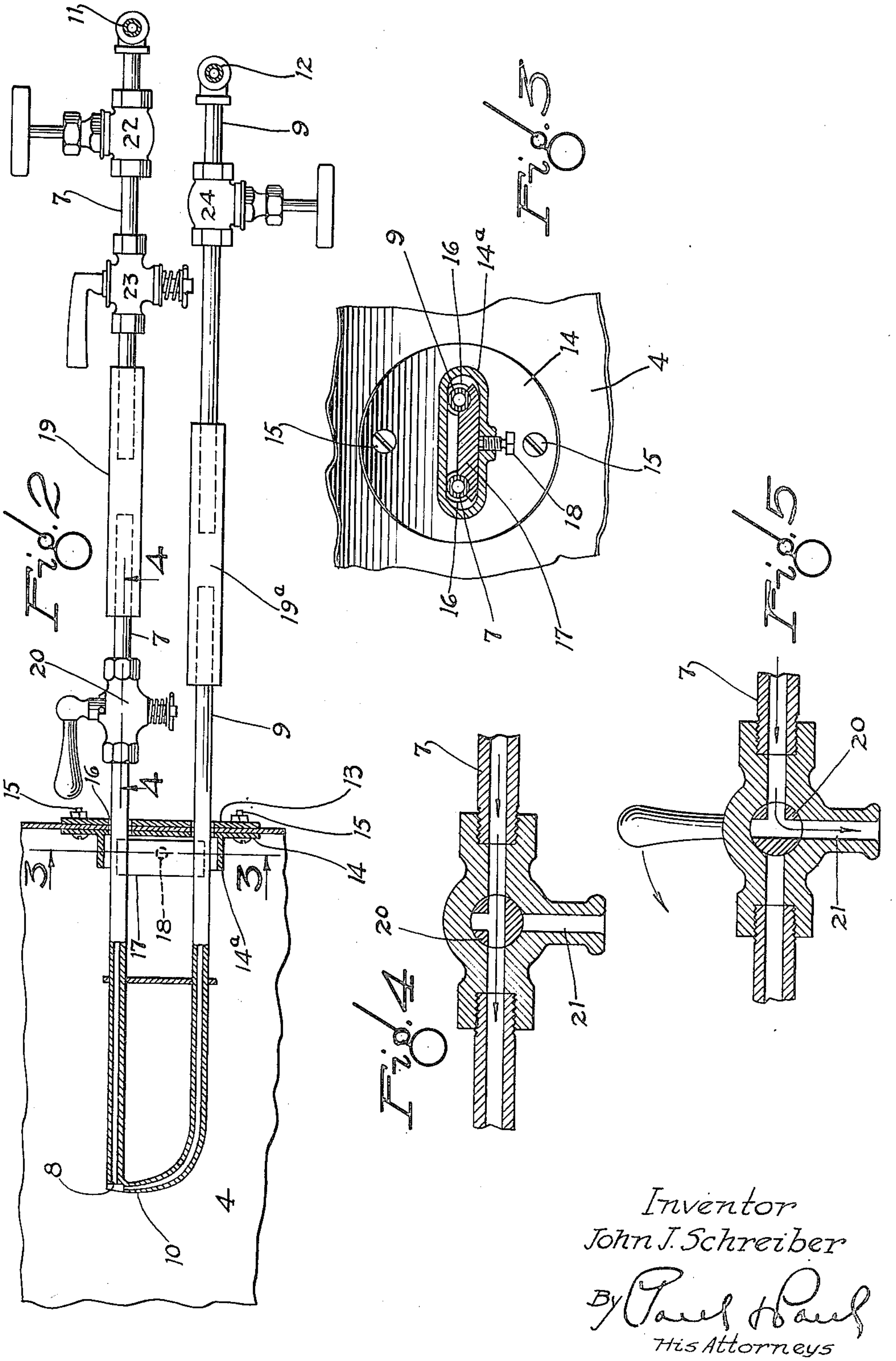

In the accompanying drawings forming part of this specification,

Figure 1 is a side elevation of a grinding mill, partially in section, with my invention applied thereto, Figure 2 is a detailed sectional view of the apparatus for delivering the brine to the feed, Figure 3 is a sectional view on the line 3—3 of Figure 2, Figure 4 is a sectional view on the line 4—4 of Figure 2, Figure 5 is a detail sectional view of the three-way testing valve, Figure 6 is a detail view illustrating how the spraying or atomizing apparatus may be tilted to adapt the device to the angle of the pipe wall.

In the drawing, 2 represents a grinder of any ordinary or preferred construction, having a suitable feed hopper 3 from which the material is delivered to the grinder beneath. 4 is a trunk or pipe leading from the base of the grinder and extending upwardly therefrom to a powerful suction fan 5 having a pipe outlet 6 through which the ground material is delivered to the bins or any other desired point. When the mill is in operation, grinding at high speed, the trunk 4 will contain a stream of the ground material flowing rapidly therethrough, the stream extending from wall to wall of the pipe, as indicated, the suction of the fan being sufficient to impart a rapid flow to the ground material.

In the wall of the pipe, preferably adjacent to the fan, I mount a spraying or atomizing apparatus by means of which a suitable brine may be delivered in the form of a spray or vapor into the pipe to be absorbed by the particles of feed or other ground material. This apparatus comprises a pipe 7 having an outlet opening 8 and a similar pipe 9 having a curved nozzle 10 arranged adjacent to the opening 8 for projecting a stream of air under pressure across the said opening, for the purpose of atomizing and spraying the brine flowing therethrough. The pipe 7 has an extension 11 leading to a brine storage tank, not shown, and the pipe 9 communicates with an extension 12 which leads to a suitable air compressor. The pipes may be mounted in any suitable way on the mill and I prefer to provide a plate 13 on the outer side of the trunk 4 and flanged plate 14 on the inner side securing these plates to the wall of the trunk by suitable means, such as bolts 15. Holes 16 are provided in the plates and the wall of the trunk to receive the pipes 7 and 9.

I also prefer to provide a plate 17 within the flange 14[a] and mount a set screw 18 in the wall of said flange to engage the plate 17 and clamp it securely against the walls of the pipes 7 and 9, thereby securing them at any desired pitch or inclination in the wall of the trunk. With this device I am able to mount the apparatus on an elbow or angle of the trunk, if desired, or in any other position thereon.

19 and 19[a] represent sections of hose of flexible material adapted to be interposed in the pipes 7 and 9 to take up the vibration resulting from the very rapid operation of the grinding mill and prevent the transmission of such vibration to the fixed parts of the brine feeding apparatus. The pipe 7 is provided with a three-way valve 20 having a testing port or passage 21 by means of which the operator adjusting the valve to the position shown in Figure 5, can divert the brine temporarily from the trunk and deliver it into a suitable cup or receptacle beneath the valve for examination or testing purposes.

22 is a regulating valve mounted in the pipe 7 that is set for the desired flow of the brine and is thereafter undisturbed. 23 is a shut-off valve by means of which the flow of brine through the pipe is entirely cut off when the mill is not in operation or when for any other purpose it is desired to check the delivery of the brine. The pipe 9 is provided with a similar flexible insert 19[a] and a suitable shut-off valve 24 is provided in this pipe by means of which the flow of air may be entirely cut off whenever desired.

In the operation of the device, the fan, revolving at high speed, will take the ground feed away from the grinder, drawing it at a high velocity through the pipe leading from the grinder to the fan. During this movement of the feed I subject it to the spray of brine delivered in an atomized form, preferably at a point adjacent to the fan, though of course any other place of delivery may be employed, if desired. I have found that salt delivered to the ground cereal in the form of a brine will be readily absorbed by the ground particles and the saline agent uniformly distributed through the material and without adding to the percentage of moisture contained in the mixture when it is delivered to the bins. In other words, the heat of the ground material resulting from the operation of the grinder and the action of the fan will remove completely all trace of moisture contained in the saline solution, leaving the ground material impregnated to the desired degree with the salt. I am therefore able with this apparatus to deposit the desired amount of salt in the feed without adding to the percentage of moisture contained therein when the material is discharged from the mill.

I claim as my invention:

1. An apparatus for treating ground cereal, comprising a trunk through which the cereal passes, a plate secured to the trunk over an opening therein and provided with an inwardly extending elongated flange, a spacing plate angularly adjustable within the flange and provided on its opposite edges with pipe seats, spray pipes engaged in the seats whereby adjustment of the spacing plate will effect angular adjustment of the pipes in unison, and means for holding spacing plate in an adjusted position.

2. An apparatus for treating ground cereal comprising air and liquid pipes having an atomizing nozzle adapted to be mounted in the wall of a trunk through which the ground cereal is flowing, and means for mounting the pipes on said trunk for angular adjustment to allow said pipes to be tilted at any desired angle with respect to the wall of the trunk whereby the spray may be injected into the trunk at an angle to the axis thereof.

3. A process of salting cereals which consists in blowing the cereal into a stream of suspended particles, injecting a spray of brine into the stream whereby the separated particles of the cereal and the separated particles of the brine may come into intimate contact with each other and then removing the moisture so introduced.

4. A process of treating cereals which consists in finely grinding the cereal, delivering the same immediately through a passage by means of a fluid current, introducing a spray of saline solution into the material as it is delivered through the passage and then removing the moisture by the inherent heat of the ground material.

5. A process of treating cereals which consists in impregnating the ground particles of the material suspended in a current of air with a saline solution and then drying the material to remove the added moisture prior to the ground particles leaving the stream.

In witness whereof, I have hereunto set my hand this 19″ day of January, 1921.

JOHN J. SCHREIBER.